US 9,892,163 B2

(12) United States Patent
Kim et al.

(10) Patent No.: US 9,892,163 B2
(45) Date of Patent: Feb. 13, 2018

(54) OPTIMAL OPERATOR PLACEMENT FOR DISTRIBUTED QUERY PROCESSING

(71) Applicants: Ki Hong Kim, Seoul (KR); Sangyong Hwang, Baden-Wurttemberg (DE); Sung Heun Wi, Seongnam (KR); Jane Jung Lee, Seoul (KR); Joo Young Yoon, Seoul (KR); Sang Kyun Cha, Seoul (KR)

(72) Inventors: Ki Hong Kim, Seoul (KR); Sangyong Hwang, Baden-Wurttemberg (DE); Sung Heun Wi, Seongnam (KR); Jane Jung Lee, Seoul (KR); Joo Young Yoon, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 564 days.

(21) Appl. No.: 14/450,114

(22) Filed: Aug. 1, 2014

(65) Prior Publication Data

US 2015/0149442 A1    May 28, 2015

Related U.S. Application Data

(60) Provisional application No. 61/909,332, filed on Nov. 26, 2013.

(51) Int. Cl.
*G06F 17/30* (2006.01)

(52) U.S. Cl.
CPC .. *G06F 17/30469* (2013.01); *G06F 17/30466* (2013.01); *G06F 17/30463* (2013.01)

(58) Field of Classification Search
CPC ........ G06F 17/30463; G06F 17/30469; G06F 17/30342; G06F 17/30466; G06F 17/30536
USPC ......... 707/718, 716, 719, 713, 714; 709/217
See application file for complete search history.

(56) References Cited

U.S. PATENT DOCUMENTS

| | | | | |
|---|---|---|---|---|
| 7,984,043 B1 * | 7/2011 | Waas | ................ | G06F 17/30932 707/718 |
| 8,880,510 B2 * | 11/2014 | Fricke | ............... | G06F 17/30442 707/719 |
| 2011/0145255 A1 * | 6/2011 | Kim | .................. | G06F 17/30327 707/741 |
| 2012/0173515 A1 * | 7/2012 | Jeong | ................ | G06F 17/30569 707/718 |

OTHER PUBLICATIONS

Papadomanolakis et al., "Efficient Use of the Query Optimizer for Automated Physical Design"; VLDB '07, Sep. 2007; 12 pages.*
Seshadri et al., "Optimizing Multiple Distributed Stream Queries Using Hierarchical Network Paritions"; IEEE 2007; 10 pages.*

* cited by examiner

*Primary Examiner* — Monica Pyo
(74) *Attorney, Agent, or Firm* — Mintz, Levin, Cohn, Ferris, Glovsky and Popeo, P.C.

(57) ABSTRACT

Total global minimum costs can be determined for multiple sub-plans for completing a multi-operation database process to be performed in a distributed database management system that includes a plurality of nodes. The multiple sub-plans can include different distributions of node locations of a plurality of operators among the plurality of nodes. An optimal plan having a lowest total minimum global cost can be selected from the multiple sub-plans.

20 Claims, 6 Drawing Sheets

OPTIMAL OPERATOR PLACEMENT FOR DISTRIBUTED QUERY PROCESSING

CROSS-REFERENCE TO RELATED APPLICATION

The current application claims priority under 35 U.S.C. § 119(e) to U.S. Provisional patent application Ser. No. 61/909,332 filed on Nov. 26, 2013, the disclosure of which is incorporated by reference herein in its entirety.

TECHNICAL FIELD

The subject matter described herein relates to database management systems in general and, more particularly, to improving distributed query processing in such systems.

BACKGROUND

In a distributed database management system (DBMS) having multiple computing nodes, a greedy algorithm can be used in determining node locations for placement of operators that perform operations on tables (or optionally on other database objects), for example as part of responding to queries or other database transactions or operations (e.g. joins, aggregations, etc.)

A greedy algorithm follows a problem solving heuristic of making a locally optimal choice at each stage with the hope of finding a global optimum. In other words, the algorithm chooses an option from among the immediately available options that appears to provide the most benefit based on the current situation. A greedy strategy does not in general produce an optimal solution in all cases. However, such an approach can yield locally optimal solutions that approximate a global optimal solution in a reasonable time.

SUMMARY

The current disclosure is generally directed to approaches for improved placement of tables and/or selection of node locations for performing operations in a distributed DBMS. In some aspects, total global minimum costs are determined for multiple sub-plans for completing a multi-operation database process to be performed in a distributed database management system that includes a plurality of nodes. The multiple sub-plans include different distributions of node locations of a plurality of operators among the plurality of nodes. An optimal plan having a lowest total minimum global cost is selected from the multiple sub-plans.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an in-memory database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
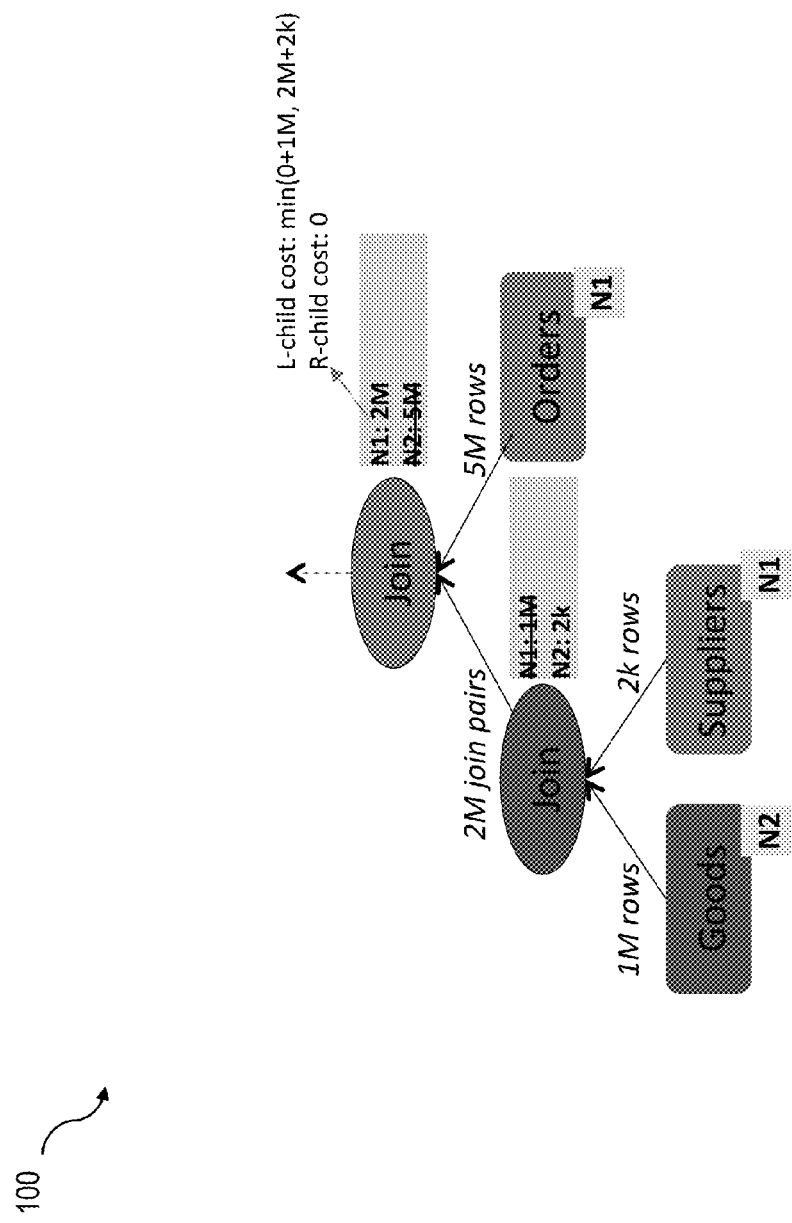
FIG. 1 shows a diagram illustrating an example of operation placement based on a greedy algorithm.

As noted above, a greedy placement algorithm does not always yield optimal global results for locations of database operators. FIG. 1 shows a diagram 100 illustrating an example of greedy placement of table locations across two nodes (N1 and N2) in a distributed DBMS. In the example shown, a greedy algorithm is generally incapable of finding an optimal table placement. As shown in FIG. 1, the greedy algorithm would choose to perform a first join of the goods and suppliers tables at node N2 because doing so would require transfer of 2k rows of the suppliers table from node N1 to node N2 rather than 1M rows of the goods table from node N2 to node N1. The second join of the resulting join pairs from the first join with the orders table would then occur at N1 because doing so would require a transfer of the 2M join pairs from N2 to N1 rather than 5M rows of the orders table from node N1 to node N2. The total number of rows transferred between nodes in this example is 2M+2k.

Figure 2:
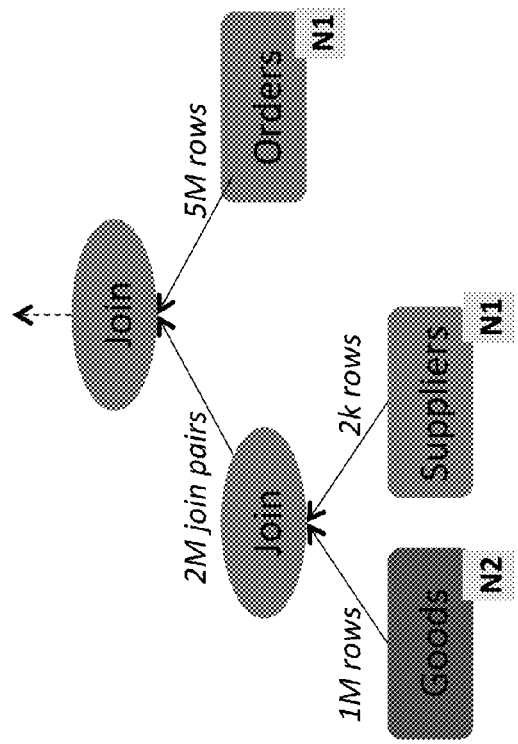
FIG. 2 shows a diagram illustrating an optimal placement of operations.

In contrast, the minimum number of transferred pairs would occur by transferring the 1M rows of the goods table from node N2 to node N1 and then performing both joins at node N1 as shown in the diagram 200 of FIG. 2. In this case, the total number of transferred rows is only 1M (transferring of the goods table from node N2 to node N1).

Figure 3:
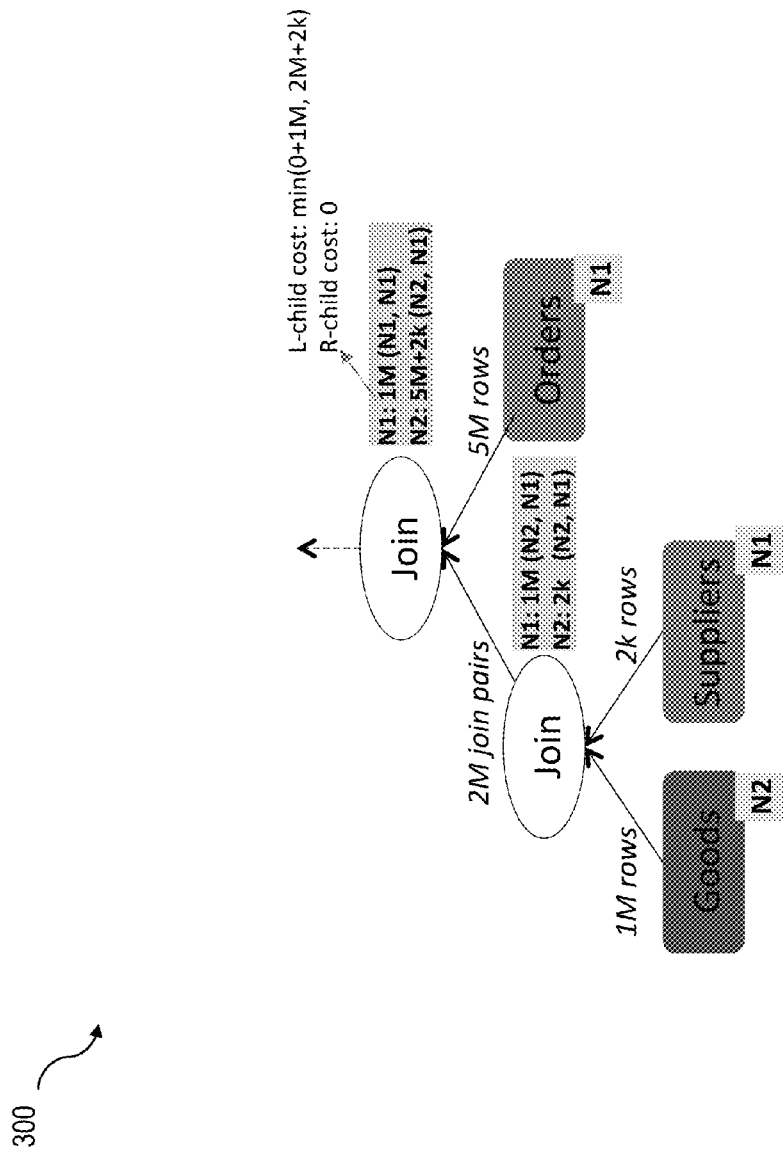
FIG. 3 and FIG. 4 show diagrams illustrating an approach to achieving an optimal location of operators consistent with implementations of the current subject matter.
Figure 4:
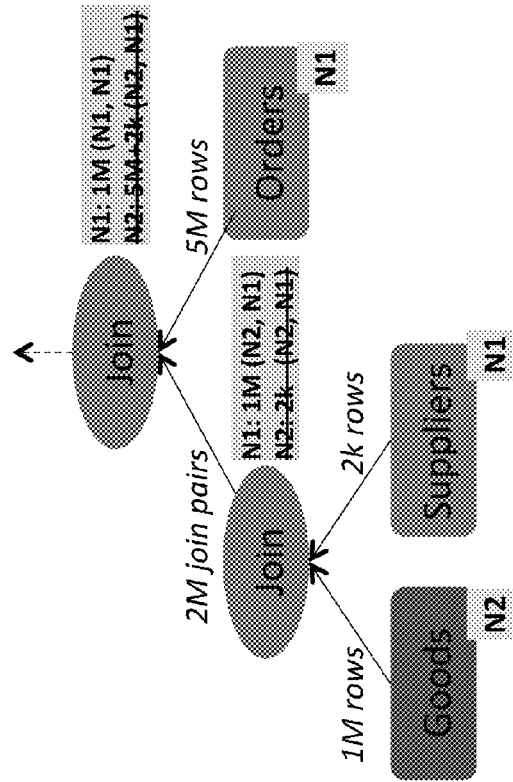

As shown in the diagrams 300, 400 of FIG. 3 and FIG. 4, optimal operator placement can be achieved consistent with implementations of the current subject matter by assuming that an operator can be placed on each node. The total minimal cost for each of the placements can then be maintained. A top operator can choose the best placement. In other words, the selection of the join locations in the example discussed above in reference to FIG. 1 and FIG. 2 can be made at a global level rather that on an operator-by-operator basis. Child table transfer counts are also considered in deciding which of two or more tables to transfer to a common node for operator processing. For example, the first join of the goods and suppliers tables, which are respectively on nodes N2 and N1 can be considered, as can the child transfer costs of moving the join pairs resulting from the first join or from moving another table.

An algorithm for accomplishing these features of the current subject matter can be formulated as follows. A logical operator P has I input relations or child operators, denoted by $C{\downarrow}1$~$C{\downarrow}I$. The operator P has K alternative execution algorithms (so called physical operators), denoted by $P{\uparrow}1$~$P{\uparrow}K$. Under these conditions, the Cost(P), which is the optimal cost of processing the sub-tree rooted at P and Cost(P|n), which in turn is the optimal cost of processing the sub-tree rooted at P on location n, can be expressed as follows:

$$\text{Cost}(P) = \min_T n[\text{Cost}(P|n)] = \min_T n\{\min_T k[\text{Cost}(P{\uparrow}k|n)]\} \quad (1)$$

Furthermore, where Compute($P^k$|n) is the optimal computation cost of executing $P^k$ on location n when its entire inputs are also on location n and Transfer($P^k$,m,n) is the cost of transferring P's outcome from location m to location n, the following expression can be used:

$$\text{Cost}(P{\uparrow}k|n) = \text{Compute}(P{\uparrow}k|n) + \Sigma i{\uparrow} \text{Min}(\text{Cost}(C{\downarrow}I|n), \min_T m[\text{Cost}(C{\downarrow}i|m) + \text{Transfer}(P^k,m,n)]) \quad (2)$$

The above equations can be derived based on a few assumptions. First, physical operator alternatives are assumed to generate the same amount of output, in which case Transfer(P↑k, m,n) can be expressed as follows:

$$\text{Transfer}(P{\uparrow}k,m,n) \stackrel{\Delta}{=} \text{Transfer}(P,m,n) \text{ for every } k \in K \quad (3)$$

Another assumption can be that every location has the same and symmetric network configuration, in which case Transfer(P,m,n) $\stackrel{\Delta}{=}$ Transfer(P) for every m and n, where m,n∈N and m≠n. Applying these assumptions, the Cost(P|n) can be expressed as follows:

$$\text{Cost}(P|n) = \min_T k[\text{Compute}(P{\uparrow}k|n) + \Sigma i{\uparrow} \text{Min}(\text{Cost}(C{\downarrow}i|n), \min_T m[\text{Cost}(C{\downarrow}i|m) + \text{Transfer}(P)])] =$$
$$\min_T k[\text{Compute}(P{\uparrow}k|n) + \Sigma i{\uparrow} \text{Min}(\text{Cost}(C{\downarrow}i|n), \text{Cost}(C{\downarrow}i) + \text{Transfer}(P))] \quad (4)$$

Combining these equations yields the following expression for Cost(P):

$$\text{Cos}(P|n) = \min_T n\{\min_T k[\text{Compute}(P{\uparrow}k|n)] + \Sigma i{\uparrow} \text{Min}(\text{Cost}(C{\downarrow}i|n), \text{Cost}(C{\downarrow}i) + \text{Transfer}(P))\} \quad (5)$$

Where |I| is the number of children or the number of input tables, |K| is the number of alternative sub-plans of P and |N| is the number of locations, the "worst case" complexity of this algorithm can be expressed as follows:

$$O(|N| \times (|K| + |I|)) \quad (6)$$

The actual complexity for a given instance of the algorithm can be expressed as follows:

$$O(|K|) + O(|N| \text{ or } O(|K|) \quad (7)$$

This result can occur because, in many cases, the term $\min_T k[\text{Compute}(P{\uparrow}k|n)]$ in equation (5) results in the same value regardless of locations. In the event that this term converges to a constant with location, the complexity can be expressed as follows assuming that |I| is a small value, which is true when the same set of physical operators are available at each location:

$$O(|K|) + O(|N| \times (|I|)) \quad (8)$$

It should be noted that operators that use indexes available on a specific node are an exception to the case of the same set of physical operators being available at each location.

If P is a table access operator (e.g. table scan, index search, etc.), then P is placed at its table location, and the complexity becomes (|K|) because it has no input and no alternative location. Similarly, unary operators (e.g. aggregation and selection) are placed together with their child (or children) and thus have complexity of (|K|) as well as long as the output of a unary operator is not larger than its input amount. If the whole children are placed at a single location, there is generally no need to consider other locations, and the complexity also reduces to (|K|).

For non-distributed queries, while bottom-up calculating costs, if a sub-plan turns out to be more expensive than any alternative, it can be immediately pruned out because it cannot be part of an optimal query plan. For distributed queries, multiple best sub-plans (e.g. one for each location) can be advantageously maintained. A sub-plan rooted at P↑1 can be pruned out if one of the following is satisfied:

$$\forall n \in N, \forall k \in K: \text{Cost}(P{\uparrow}l|n) > \text{Cost}(P{\uparrow}k|n) \quad (9)$$

$$\forall n \in N, \forall (k,m), k \in K, m \in N: \text{Cost}(P{\uparrow}l|n) > \text{Cost}(P{\uparrow}k|m) + \text{Transfer}(P) \quad (10)$$

Each operator can additionally keep the following information (e.g. the following can be tracked for each operator): a best sub-tree cost for each location, child locations corresponding to the best sub-tree costs (as many as the product of the number of children and the number of locations), and child plans corresponding to the best sub-tree costs (as many as the product of the number of children and the number of locations). Per equation (9), a sub-plan rooted at node location P↑1 can be pruned out if a cost for that sub-plan is greater than the best sub-tree cost for the node location P↑1. Per equation 10, a sub-plan rooted at node location P↑1 be pruned out if a cost for that sub-plan is greater than the best sub-plan cost for a second sub-plan that involves action at another node location (m) plus a transfer cost (e.g. Transfer (P)) for transferring one or more tables between node locations as part of the second sub-plan.

With regard to table replication, for an access method P against non-replicated tables, the Cost(P|n) can be set to Compute(P|n) if n is the table location. Otherwise, it can be set to infinity. For an access method P against replicated tables, the Cost(P|n) can be set to Compute(P|n) if n is the table location or its replica location. Otherwise, it can be set to infinity.

In further implementations of the current subject matter, distributed join optimization may include implementing a semi-join as an addition to each physical join algorithm. For example, in an illustrative case for which the result of "T1 JOIN T2 ON T1.A=T2.B" is required at table T1's location, required columns from table T2 can be sent to the table T1 location and the join can be performed there. In an alternative variation, the join column of table T1 can be sent to the table T2 location. The join can be performed there and the result sent back to the table T1 location. In this second option, the rowID values for table T1 and the required columns of table T2 can be a row. This approach can be useful for selective joins with wide projection.

Node capability considerations can include determining the placement considering node capabilities such as computing power and effective DoP (or workloads).

Figure 5:
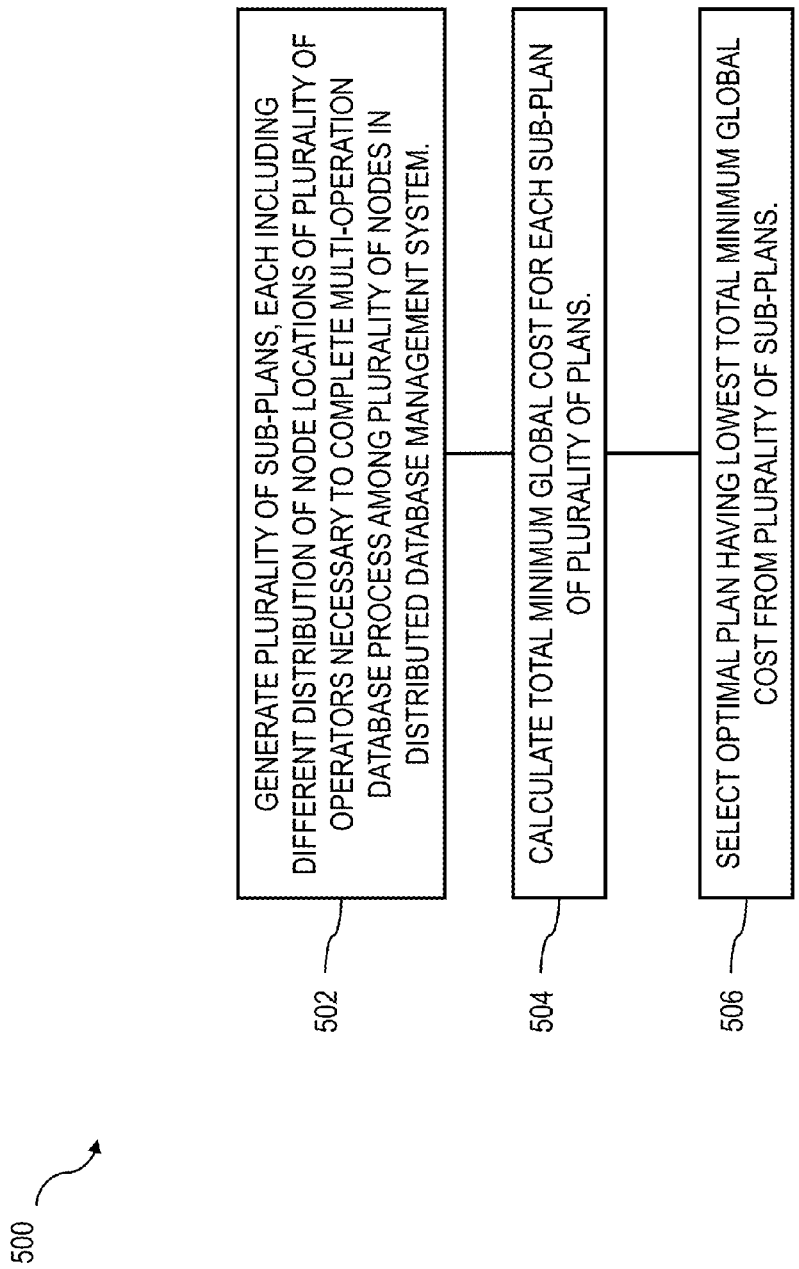
FIG. 5 shows a process flow chart illustrating features of a method consistent with implementations of the current subject matter.

FIG. 5 shows a process flow chart 500 illustrating features that can be included in a method consistent with implementations of the current subject matter. At 502, a plurality of sub-plans are generated for a multi-operation database process to be performed in a distributed database management system that includes a plurality of nodes. Each of the plurality of sub-plans includes a different distribution of node locations of a plurality of operators among the plurality of nodes. The plurality of operators include those operators those necessary to complete the multi-operation database process. The method can also include tracking, for each operator of the plurality of operators, at least one of a best sub-tree cost for each node location, child locations corresponding to the best sub-tree costs; and child plans corresponding to the best sub-tree costs.

At 504, a total minimum global cost is calculated for each of the plurality of plans. For example, the calculating of the total minimum global cost for each of the plurality of sub-plans can include quantifying child table transfer counts associated with at least one operation of the multi-operation database process. Alternatively or in addition, the calculating of the total minimum global cost for each of the plurality of sub-plans can include quantifying child table transfer counts associated with at least one operation of assuming placement of a physical operator on either of at least two nodes generates a same amount of output and/or assuming that each node of the plurality of node has a same and symmetric network configuration.

At 506, an optimal plan is selected from the plurality of sub-plans. The optimal plan is the sub-plan of the plurality of sub-plans having a lowest total minimum global cost. The selecting can optionally include pruning at least one sub-plan from the plurality of sub-plans as discussed above.

Figure 6:
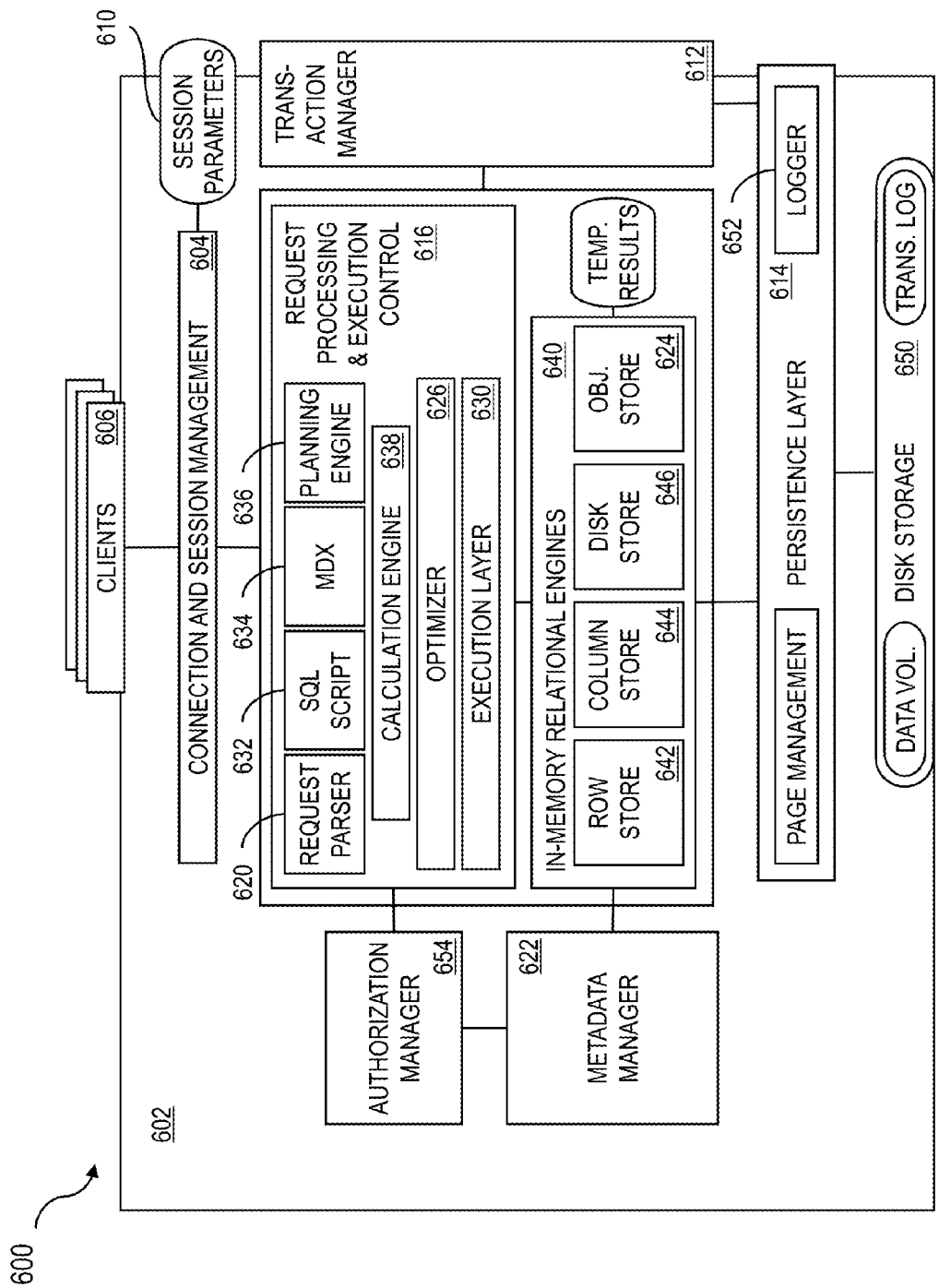
FIG. 6 shows a diagram illustrating features of a representative main memory based DBMS.

FIG. 6 shows a block diagram of an in-memory relational database server 600 consistent with implementations of the current subject matter. A connection and session management component 602 of an in-memory database system 604 creates and manages sessions and connections for the database clients 606. For each session a set of parameters 610 is maintained such as for example auto commit settings or the current transaction isolation level. Once a session is established, database clients 606 can use logical (e.g. SQL) statements to communicate with the in-memory database system 604. For analytical applications the multidimensional query language MDX can also be supported.

Each statement can be processed in the context of a transaction. New sessions can be implicitly assigned to a new transaction. A transaction manager 612 can coordinate transactions, control transactional isolation, and keep track of running and closed transactions. When a transaction is committed or rolled back, the transaction manager 612 can inform the involved engines about this event so they can execute necessary actions. The transaction manager 612 can cooperate with a persistence layer to achieve atomic and durable transactions.

Requests received from the database clients 606 can be analyzed and executed by a set of request processing and execution control components 616, which can include a request parser 620 that analyses a request from a database client 606 and dispatches it to a responsible component. Transaction control statements can, for example, be forwarded to the transaction manager 612, data definition statements can be dispatched to a metadata manager 622 and object invocations can be forwarded to an in-memory object store 624. Data manipulation statements can be forwarded to an optimizer 626, which creates an optimized execution plan that is provided to an execution layer 630. The execution layer 630 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 632, which is based on side effect free functions that operate on tables using SQL queries for set processing, can be used to enable optimizations and parallelization. The MDX language 634 can be used to provide support for multidimensional queries. A planning engine 636 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 632, MDX 634, and planning engine 636 operations can be implemented using a common infrastructure called a calculation engine 638. Metadata can be accessed via the metadata manager component 622. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 622.

One or more relational engines 640, for example an in-memory row store 642, an in-memory column store 644, a disk-based store 646, and the in-memory object store 624 mentioned above can communicate with the request processing and execution control components 616, the metadata manager 622, and the in-memory persistence layer 614. The row store 642 and column store 644 are each relational in-memory data engines that can store data in a row-based or column-based way, respectively. Some data, such as for example tracing data, need not be kept in memory all the time. The disk-based store 646 can handle such data. Data in the disk-based store 146 can be primarily stored in disk storage 650 and only moved to memory buffers (e.g. the persistence layer 614) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 614 can be responsible for durability and atomicity of transactions and can ensure that the database is restored to the most recent committed state after a restart and that transactions are either completely executed or completely undone. To achieve this goal in an efficient way, the persistence layer 614 can use a combination of write-ahead logs, shadow paging and save points. The persistence layer 614 can offer interfaces for writing and reading data and can also contain a logger 652 that manages the transaction log. Log entries can be written implicitly by the persistence layer 614 when data are written via a persistence interface or explicitly by using a log interface.

An authorization manager 654 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by at least one processor, cause the at least one processor to perform operations comprising:
generating, for a multi-operation database process to be performed in a distributed database management system comprising a plurality of computing nodes comprising respective data processors and having respective node locations, a plurality of sub-plans, each of the plurality of sub-plans comprising a different distribution of node locations of a plurality of operators among the plurality of computing nodes, the plurality of operators being those necessary to complete the multi-operation database process;
calculating a total minimum global cost for each sub-plan of the plurality of sub-plans; and
selecting an optimal plan from the plurality of sub-plans, the optimal plan having a lowest total minimum global cost, the selecting including pruning at least one sub-plan from the plurality of sub-plans by at least eliminating at least one sub-plan having a cost greater than a best sub-tree cost for a location of a node location;
wherein the plurality of computing nodes includes a first node and a second node, and a first sub-plan of the plurality of sub-plans includes a first join operation and a second join operation, wherein:
the first join operation comprises transferring a first number of rows of a first table from the second node to the first node, and joining the first number of rows with a second number of rows of a second table at the first node, the first number of rows being greater than the second number of rows, and
the second join operation comprises joining a result of the first join operation with a third number of rows of a third table at the first node, the third number of rows greater than the first number of rows.

2. The computer program product as in claim 1, the pruning further comprising:
tracking, for each operator of the plurality of operators, a best sub-tree cost for each node location, one or more child locations corresponding to the best sub-tree costs, and one or more child plans corresponding to the best sub-tree costs.

3. The computer program product as in claim 1, the pruning further comprising eliminating at least one sub-plan having a cost greater than a best sub-plan cost for a second sub-plan that involves action at another node location plus a transfer cost for transferring one or more tables between node locations as part of the second sub-plan.

4. The computer program product as in claim 1, wherein the calculating of the total minimum global cost for each of the plurality of sub-plans further comprises quantifying child table transfer counts associated with at least one operation of the multi-operation database process.

5. The computer program product as in claim 1, wherein the calculating of the total minimum global cost for each of the plurality of sub-plans further comprises quantifying child table transfer counts associated with at least one operation of assuming placement of a physical operator on either of at least two nodes generates a same amount of output.

6. The computer program product as in claim 1, wherein the calculating of the total minimum global cost for each of the plurality of sub-plans further comprises assuming that each computing node of the plurality of computing nodes has a same and symmetric network configuration.

7. A system comprising:
computer hardware configured to perform operations comprising:
generating, for a multi-operation database process to be performed in a distributed database management system comprising a plurality of computing nodes comprising respective data processors and having respective node locations, a plurality of sub-plans, each of the plurality of sub-plans comprising a different distribution of node locations of a plurality of operators among the plurality of computing nodes, the plurality of operators being those necessary to complete the multi-operation database process;
calculating a total minimum global cost for each sub-plan of the plurality of sub-plans; and
selecting an optimal plan from the plurality of sub-plans, the optimal plan having a lowest total minimum global cost, the selecting including pruning at least one sub-plan from the plurality of sub-plans by at least eliminating at least one sub-plan having a cost greater than a best sub-tree cost for a location of a node location;
wherein the plurality of computing nodes includes a first node and a second node, and a first sub-plan of the plurality of sub-plans includes a first join operation and a second join operation, wherein:
the first join operation comprises transferring a first number of rows of a first table from the second node to the first node, and joining the first number of rows with a second number of rows of a second table at the first node, the first number of rows being greater than the second number of rows, and
the second join operation comprises joining a result of the first join operation with a third number of rows of a third table at the first node, the third number of rows greater than the first number of rows.

8. The system as in claim 7, the pruning further comprising:
tracking, for each operator of the plurality of operators, a best sub-tree cost for each node location, one or more child locations corresponding to the best sub-tree costs, and one or more child plans corresponding to the best sub-tree costs.

9. The system as in claim 7, the pruning further comprising: eliminating at least one sub-plan having a cost greater than a best sub-plan cost for a second sub-plan that involves action at another node location plus a transfer cost for transferring one or more tables between node locations as part of the second sub-plan.

10. The system as in claim 7, wherein the calculating of the total minimum global cost for each of the plurality of sub-plans further comprises quantifying child table transfer counts associated with at least one operation of the multi-operation database process.

11. The system as in claim 7, wherein the calculating of the total minimum global cost for each of the plurality of sub-plans further comprises quantifying child table transfer counts associated with at least one operation of assuming placement of a physical operator on either of at least two nodes generates a same amount of output.

12. The system as in claim 7, wherein the calculating of the total minimum global cost for each of the plurality of sub-plans further comprises assuming that each node of the plurality of computing nodes has a same and symmetric network configuration.

13. The system as in claim 7, wherein the computer hardware comprises:
a programmable processor; and
a machine-readable storage medium storing instructions that, when executed by at least one processor, cause the at least one processor to perform at least some of the operations.

14. A computer-implemented method comprising:
generating, for a multi-operation database process to be performed in a distributed database management system comprising a plurality of computing nodes comprising respective data processors and having respective node locations, a plurality of sub-plans, each of the plurality of sub-plans comprising a different distribution of node locations of a plurality of operators among the plurality of computing nodes, the plurality of operators being those necessary to complete the multi-operation database process;
calculating a total minimum global cost for each sub-plan of the plurality of sub-plans; and
selecting an optimal plan from the plurality of sub-plans, the optimal plan having a lowest total minimum global cost, the selecting including pruning at least one sub-plan from the plurality of sub-plans by at least eliminating at least one sub-plan having a cost greater than a best sub-tree cost for a location of a node location;
wherein the plurality of computing nodes includes a first node and a second node, and a first sub-plan of the plurality of sub-plans includes a first join operation and a second join operation, wherein:
the first join operation comprises transferring a first number of rows of a first table from the second node to the first node, and joining the first number of rows with a second number of rows of a second table at the first node, the first number of rows being greater than the second number of rows, and
the second join operation comprises joining a result of the first join operation with a third number of rows of a third table at the first node, the third number of rows greater than the first number of rows.

15. The computer-implemented method as in claim 14, the pruning further comprising:
tracking, for each operator of the plurality of operators, a best sub-tree cost for each node location, one or more child locations corresponding to the best sub-tree costs, and one or more child plans corresponding to the best sub-tree costs.

16. The computer-implemented method as in claim 14, the pruning comprising: eliminating at least one sub-plan having a cost greater than a best sub-plan cost for a second sub-plan that involves action at another node location plus a transfer cost for transferring one or more tables between node locations as part of the second sub-plan.

17. The computer-implemented method as in claim 14, wherein the calculating of the total minimum global cost for each of the plurality of sub-plans further comprises quantifying child table transfer counts associated with at least one operation of the multi-operation database process.

18. The computer-implemented method as in claim 14, wherein the calculating of the total minimum global cost for each of the plurality of sub-plans further comprises quantifying child table transfer counts associated with at least one operation of assuming placement of a physical operator on either of at least two nodes generates a same amount of output.

19. The computer-implemented method as in claim 14, wherein the calculating of the total minimum global cost for each of the plurality of sub-plans further comprises assuming that each node of the plurality of computing nodes has a same and symmetric network configuration.

20. The computer-implemented method as in claim 14, wherein at least one of the generating, the calculating, and the selecting is performed by one or more systems comprising computer hardware.

* * * * *